US010587685B2

(12) United States Patent
Kuramkote et al.

(10) Patent No.: US 10,587,685 B2
(45) Date of Patent: Mar. 10, 2020

(54) CROSS-PLATFORM REPLICATION OF LOGICAL UNITS

(71) Applicant: NetApp, Inc., Sunnyvale, CA (US)

(72) Inventors: Ravindra Kuramkote, Sunnyvale, CA (US); Kiyoshi James Komatsu, San Mateo, CA (US); Ling Na Zheng, Saratoga, CA (US); Rachita Kothiyal, San Jose, CA (US); Michael Lee Federwisch, San Jose, CA (US); Vijay Mohan Deshmukh, Fremont, CA (US)

(73) Assignee: NetApp Inc., Sunnyvale, CA (US)

( * ) Notice: Subject to any disclaimer, the term of this patent is extended or adjusted under 35 U.S.C. 154(b) by 322 days.

(21) Appl. No.: 15/582,561

(22) Filed: Apr. 28, 2017

(65) Prior Publication Data

US 2018/0316756 A1 Nov. 1, 2018

(51) Int. Cl.
*G06F 15/16* (2006.01)
*H04L 29/08* (2006.01)

(52) U.S. Cl.
CPC ...... *H04L 67/1095* (2013.01); *H04L 67/1097* (2013.01)

(58) Field of Classification Search
CPC ............ H04L 67/1095; H04L 67/1097
See application file for complete search history.

(56) References Cited

U.S. PATENT DOCUMENTS

| 2006/0047924 | A1* | 3/2006 | Aoshima | G06F 3/061 711/161 |
| 2010/0057923 | A1* | 3/2010 | Petter | G06F 9/5061 709/229 |
| 2010/0293349 | A1* | 11/2010 | Lionetti | G06F 9/45558 711/162 |

* cited by examiner

*Primary Examiner* — Yves Dalencourt
(74) *Attorney, Agent, or Firm* — Cooper Legal Group, LLC

(57) ABSTRACT

To replicate a source LUN to a different storage system platform, a first storage system transmits a request to replicate a LUN along with attributes for the LUN to a second storage system. The second storage system maps the attributes to attributes used and understood by the platform of the second storage system. The second storage system then creates a destination LUN based on the mapped attributes. Since the destination LUN is created with similar attributes as the source LUN, the destination LUN can store the replicated data of the source LUN while still being accessed and recognized as a LUN by the second storage system. The second storage system also stores any proprietary attributes received from the first storage system so that the proprietary attributes can be supplied to the first storage system to recover the source LUN after a data loss event.

17 Claims, 5 Drawing Sheets

CROSS-PLATFORM REPLICATION OF LOGICAL UNITS

BACKGROUND

The disclosure generally relates to the field of data processing, and more particularly to multicomputer data transferring.

Storage systems may implement data replication and/or other redundancy data techniques for data loss protection and non-disruptive client access. For example, a first storage system may be on premise and provide primary data storage to clients and may replicate or back up the data to a second storage system located at a remote site. Data may be replicated at various levels of granularity, such as file level, logical unit number (LUN) level, volume level, etc.

Storage systems may be based on different storage platforms. For example, storage systems may have different versions or models of storage controllers (e.g., a storage controller with a disk based storage platform, a flash array storage platform, a volume based storage platform, a consistency group of files and/or LUNs storage platform, a distributed storage platform such as cloud storage, etc.) that store data differently, use different extent sizes, have different compression characteristics, support different types of storage operations and syntax, have different data and control interfaces, provide different user interfaces for administrators, etc.

BRIEF DESCRIPTION OF THE DRAWINGS

Aspects of the disclosure may be better understood by referencing the accompanying drawings.

DESCRIPTION

Figure 1:
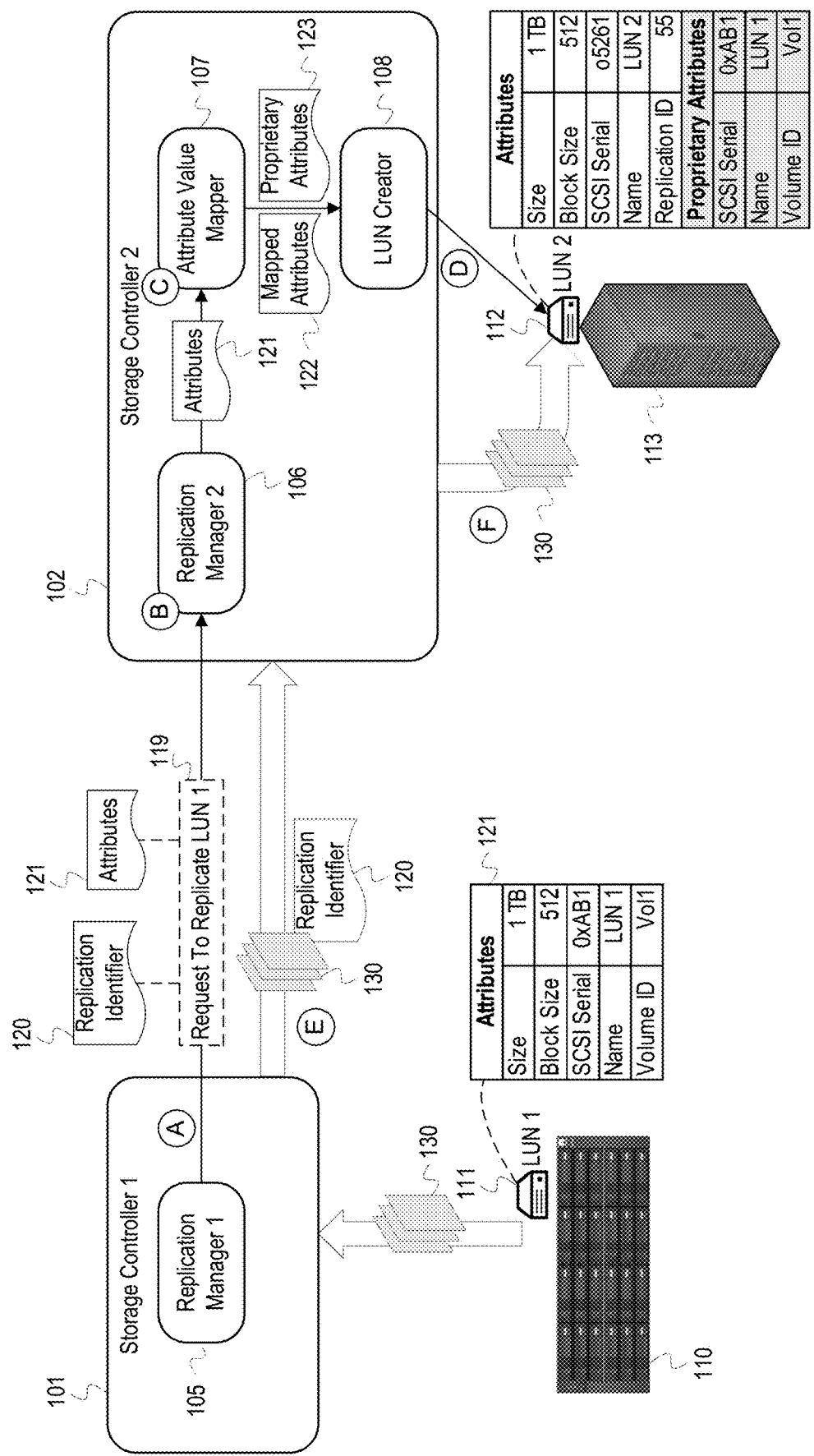
FIG. 1 depicts an example data replication across storage systems based on different platforms.

The description that follows includes example systems, methods, techniques, and program flows that embody aspects of the disclosure. However, it is understood that this disclosure may be practiced without these specific details. For instance, this disclosure refers to replicating LUNs in illustrative examples. Aspects of this disclosure can be also applied to migrating LUNs or otherwise transmitting storage objects across different storage system platforms. In other instances, well-known instruction instances, protocols, structures and techniques have not been shown in detail in order not to obfuscate the description.

Terminology

A LUN is a unique identifier designating a collection of physical or virtual storage space within a volume or aggregate of storage devices. In some implementations, a LUN is a file with one or more index nodes (inodes) that point to the available storage space. A LUN can be accessed like a hard disk and can be accessed over a storage area network using input/output (I/O) commands defined by the Serial Computer System Interface (SCSI) standard. LUNs also include LUN attributes which indicate various settings or configurations of the LUN. The attributes may indicate a size, block size, encryption type, LUN type, name, volume identifier, SCSI serial, etc., and may be indicated in metadata of the LUN using a table, key-value pairs, JavaScript Object Notation (JSON), extensible markup language (XML), etc. Different storage system platforms may use unique, proprietary attributes for LUNs. For example, some platforms may have special security or user permission attributes associated with LUNs. Typically, generic attributes like size and name can map to attributes across any platform, while proprietary attributes may not map or be useable across different platforms.

Introduction

Different storage platforms may represent LUNs in proprietary ways with different underlying structures. If a first storage system simply provides a LUN to a second storage system, the second storage system may be unable to interpret the received data as a LUN if the second storage system is based on a different platform. As a result, the second storage system will store the LUN as data and will be unable to manipulate or perform typical LUN operations on the data.

Overview

To replicate a source LUN to a storage system based on a different platform, a first storage system transmits a request to replicate a LUN along with attributes for the LUN to a second storage system. The second storage system maps the attributes to attributes used internally and understood by the platform of the second storage system. The second storage system then creates a destination LUN based on the mapped attributes. Since the destination LUN is created with similar attributes as the source LUN, the destination LUN can store the replicated data of the source LUN while still being accessed and recognized as a LUN by the second storage system. The second storage system also stores any proprietary attributes received from the first storage system so that the proprietary attributes can be supplied for recovery of the source LUN after a data loss event. Additionally, since LUNs may be referred to differently across platforms, the first storage system and the second storage system agree on a unique replication identifier to indicate data streams intended for the source LUN or the destination LUN.

Example Illustrations

FIG. 1 depicts an example data replication across storage systems based on different platforms. FIG. 1 depicts a storage controller 1 101 in communication with a storage controller 2 102. The storage controller 1 101 includes a replication manager 1 105 and utilizes a storage device 110 for storing data. The storage controller 2 102 includes a replication manager 2 106, an attribute value mapper 107, and a LUN creator 108 and utilizes a storage device 113 for storing data.

The storage controller 1 101 and the storage controller 2 102 are based on different storage system platforms and may use different operating systems or software for managing data on their respective storage devices. For example, the storage controller 1 101 may use open source storage software while the storage controller 2 102 may use proprietary storage software. Additionally, the storage devices may use different media for storing data. For example, the storage device 110 may contain flash storage arrays while the storage device 113 uses hard disk drives (HDDs). The storage controller 1 101 and the storage device 110 may be located on premises with clients accessing stored data through a local area network (LAN). The storage controller 2 102 and the storage device 113 may be remotely located and accessed by the storage controller 1 101 through a wide area network (WAN), such as the internet.

At stage A, the replication manager 1 105 of the storage controller 1 101 transmits a request 119 to replicate a LUN 1 111 to the replication manager 2 106 of the storage controller 2 102. The replication manager 1 105 manages the backing up of data on the storage device 110. For example, the replication manager 1 105 may monitor the storage device 110 for changes to data or additional data and transmit incremental backups or snapshot data streams to the storage controller 2 102 for storage on the storage device 113. The LUN 1 111 is stored on the storage device 110 and has attributes 121. FIG. 1 depicts a portion of the attributes 121 including size, block size, SCSI serial, name, and volume identifier. The replication manager 1 105 transmits the request 119 along with the attributes 121 and a proposed replication identifier 120. Since the storage controller 1 101 and the storage controller 2 102 may store LUNs in different ways or with different names, the storage controllers exchange the replication identifier 120 for indicating data or requests related to the LUN 1 111. The replication identifier 120 should a universal unique identifier (UUID) within LUN identifiers used by the storage controller 1 101 and the storage controller 2 102. If the replication identifier 120 proposed by the storage controller 1 101 is not unique to the storage controller 2 102, the storage controller 2 102 rejects the replication identifier 120 and proposes a different value to be used as the replication identifier 120. Values for the replication identifier 120 may be randomly generated to reduce the chance of collisions.

At stage B, the replication manager 2 106 processes the request 119 along with the replication identifier 120 and the attributes 121. The replication manager 2 106 stores the replication identifier 120 in a list of key-value pairs which link replication identifiers to LUN names in the storage device 113. This list of key-value pairs is used to identify a LUN in the storage device 113 for storing an incoming data stream that is associated with a replication identifier. After analyzing the attributes 121, the replication manager 2 106 may request additional attributes from the replication manager 1 105 or indicate that the received attributes 121 are insufficient for creating a LUN. The replication manager 1 105 can then supply additional attributes as needed or indicate that the additionally requested attributes are unavailable, which may cause the replication process to fail. If the attributes 121 are sufficient, the replication manager 2 106 passes the attributes 121 to the attribute value mapper 107.

At stage C, the attribute value mapper 107 analyzes the attributes 121 to generate mapped attributes 122 and proprietary attributes 123. The mapped attributes 122 include generic attributes and attributes for which the attribute value mapper 107 has been programmed to convert or map to an attribute type used by the storage controller 2 102. Generic attributes are attributes such as size and block size that are generally used across LUNs of all storage platforms, and as a result, a generic attribute in a first storage operating system may map directly to an attribute in a second storage operating system. Other attributes may not map directly but may be able to be converted or translated to be compatible with an attribute for the platform of the storage controller 2 102. For example, in FIG. 1, the storage controller 1 101 stores the SCSI serial attribute for the LUN 1 111 in a hexadecimal format, while the storage controller 2 102 stores SCSI serials in an octal format. The attribute value mapper 107 identifies that the SCSI serial in the attributes 121 is in hexadecimal and converts the SCSI serial to octal for use by the storage controller 2 102. Some generic attributes, such as name, may not be useful to map directly as the storage controller 2 102 will likely generate its own name from its own namespace. The attribute value mapper 107 may be configured with a list of attributes to map directly and other attributes to ignore or consider proprietary to the storage controller 1 101.

The proprietary attributes 123 are attributes of the attributes 121 that are unique to the operating system of the storage controller 1 101 or attributes that are not utilized by the storage controller 2 102. Even though the storage controller 2 102 does not use these attributes, the proprietary attributes 123 are retained so that the attributes can be supplied to the storage controller 1 101 in the event the LUN 1 111 needs to be restored. This process is described in more detail in FIG. 2. In FIG. 1, the proprietary attributes 123 include the name of the LUN 1 111, the volume identifier for the LUN 1 111, and the SCSI serial in a hexadecimal format.

At stage D, the LUN creator 108 creates a LUN 2 112 using the mapped attributes 122. The LUN creator 108 creates the LUN 2 112 according to the process and format of the storage system platform of the storage controller 2 102. For example, the LUN creator 108 may create a file with an inode structure pointing to the storage space reserved for the LUN 2 112. The underlying structure of the LUN 2 112 is different than the underlying structure of the LUN 1 111, as the LUNs are based on different storage system platforms. However, because the LUN 2 112 is generated using the mapped attributes 122, the LUN 2 112 can store data from the LUN 1 111.

The LUN creator 108 stores the mapped attributes 122 and the proprietary attributes 123 in metadata of the LUN 2 112. Since they are not used, the proprietary attributes 123 are stored opaquely, meaning that they are hidden or stored as a blob of data. For example, XML supports storing opaque blobs of data. The LUN creator 108 also generates and stores a name for the LUN 2 112 and may persist the replication identifier 120 in the metadata. The LUN creator 108 may also pass the name of the LUN 2 112 to the replication manager 2 106. The replication manager 2 106 can then update the list of key-value pairs linking replication identifiers to LUN names by associating the key for the replication identifier 120 with the name of the LUN 2 112. After the LUN 2 112 is created, the replication manager 2 106 may transmit a message to the replication manager 1 105 indicating that the storage controller 2 102 is ready to receive and back up data related to the replication identifier 120.

At stage E, the replication manager 1 105 retrieves data from the LUN 1 111 for transmitting to the storage controller 2 102 in a data stream 130. The replication manager 1 105 transmits the data stream 130 along with the replication identifier 120. At stage F, the replication manager 2 106 maps the replication identifier 120 to the LUN 2 112 and stores the data stream 130 in the LUN 2 112. The replication manager 2 106 searches the list of key-value pairs using the replication identifier 120 to identify the mapping from the replication identifier 120 to the LUN 2 112. The storage controller 2 102 then stores the data in the data stream 130 in the LUN 2 112 on the storage device 113. In some instances, the storage controller 2 102 may process the data stream 130 to separate the data stream 130 for storage into different files. For example, based on a type of the LUN 2 112, the LUN 2 112 may contain data stored across one or more files. The storage controller 2 102 separates data in the data stream 130 for storage into the respective files in the LUN 2 112. If the storage controller 2 102 restructures the data stream 130 for storage into multiple files, the storage controller 2 102 may recombine the files into a single data object prior to supplying the data to the storage controller 1 101 during recovery.

In some instances, the data stream 130 may include additional attributes or updated values for attributes supplied in the attributes 121. For example, the size of the LUN 1 111 may change during the life of the LUN 1 111. The storage controller 2 102 can supply the received attributes to the attribute value mapper 107. The attribute value mapper 107 processes the attributes in a manner similar to that described above and passes the attributes to the LUN creator 108 so that the attributes of the LUN 2 112 can be updated accordingly.

Figure 2:
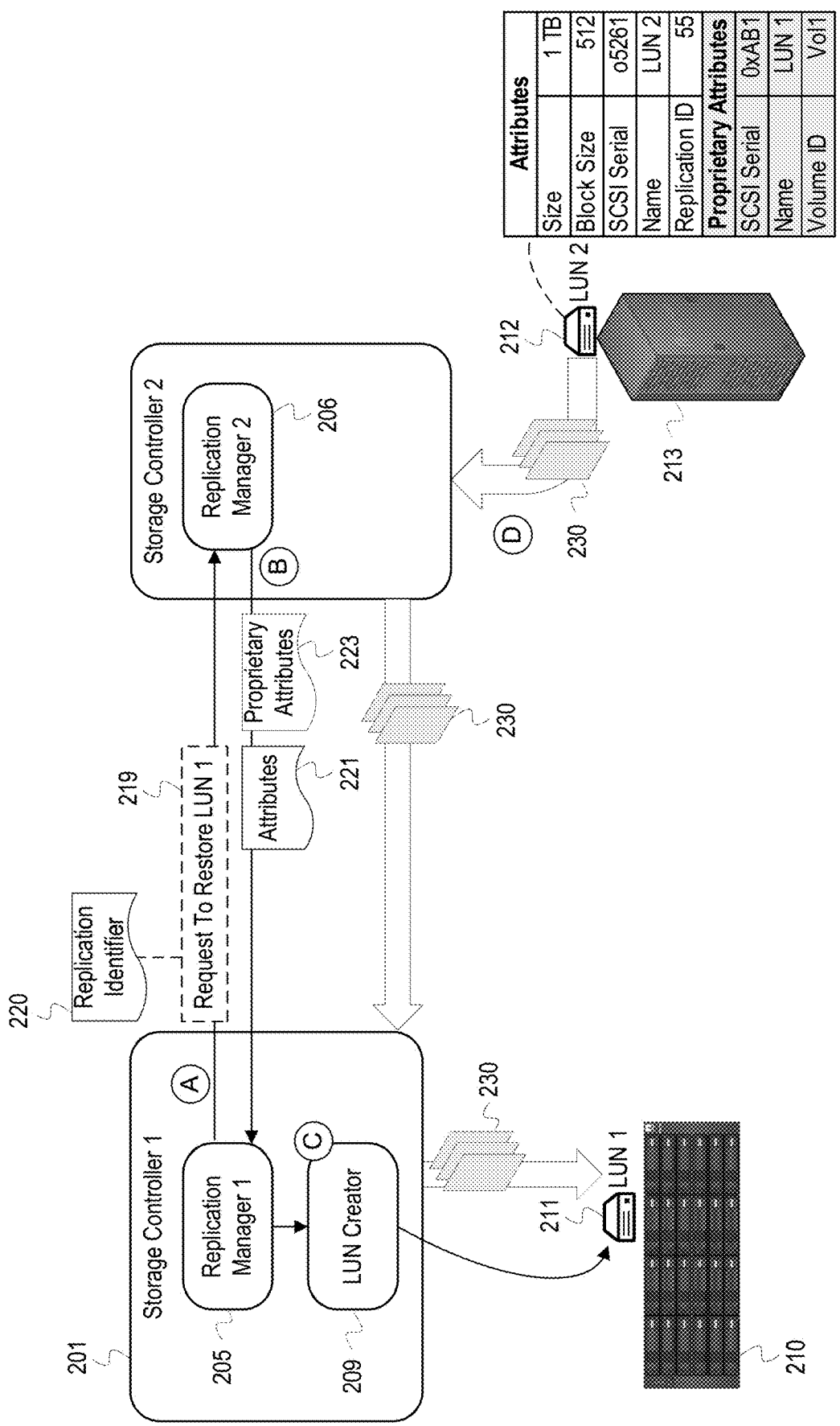
FIG. 2 depicts an example recovery of replicated data across storage systems based on different platforms.

FIG. 2 depicts an example recovery of replicated data across storage systems based on different platforms. FIG. 2 depicts a storage controller 1 201 in communication with a storage controller 2 202. The storage controller 1 201 includes a replication manager 1 205 and a LUN creator 209 and utilizes a storage device 210 for storing data. The storage controller 2 202 includes a replication manager 2 206 and utilizes a storage device 113 for storing data.

The illustration of FIG. 2 assumes that the storage device 210 experienced data loss and needs to restore from the replicated data backed up to the storage device 213. Similar to FIG. 1, the storage controller 1 201 and the storage controller 2 202 are based on different platforms and, as a result, create and manage LUNs in different ways.

At stage A, the storage controller 1 201 transmits a request 219 to restore the LUN 1 211 to the storage controller 2 202. In FIG. 2, the request 219 is depicted as also including the replication identifier 220. However, in some instances, the storage controller 1 201 may have lost data indicating replication identifiers shared between the storage controller 1 201 and the storage controller 2 202. In such instances, the storage controller 1 201 may transmit a general data restoration request to the replication manager 2 206. In response to such a request, the replication manager 2 206 can begin supplying all LUN data backed up by the storage controller 1 201 in a manner similar to that described below.

At stage B, the replication manager 2 206 determines that the LUN 2 112 is to be restored and retrieves attributes 221 and proprietary attributes 223 for the LUN 2 212. The attributes 221 include the generic attributes of the LUN 2 212. For example, the attributes 221 may include the attributes size and block size and may not include the attributes SCSI serial and name since these are specific to the storage controller 2 202. The proprietary attributes 223 are attributes which were stored opaquely in the metadata of the LUN 2 212. In FIG. 2, the proprietary attributes 223 include the SCSI serial in a hexadecimal format, a LUN name as originally used by the storage controller 1 201, and the volume identifier as used by the storage controller 1 201. The replication manager 2 206 transmits the attributes 221 and the proprietary attributes 223 to the replication manager 1 205. The replication manager 1 205 passes the attributes to the LUN creator 209.

At stage C, the LUN creator 209 creates the LUN 1 211 based on the attributes 221 and the proprietary attributes 223. Because the proprietary attributes 223 were retained, the LUN creator 209 is able to recreate LUN 1 211 in the same form prior to the data loss. Additionally, the LUN creator 209 does not perform any mapping or translating of attributes from the storage controller 2 202 since the proprietary attributes 223 are supplied in their original form. After recreating the LUN 1 211, the LUN creator 209 may transmit a message indicating that data for the LUN 1 211 can now be restored.

At stage D, the storage controller 2 202 retrieves data 230 from the LUN 2 212 and supplies the data 230 to the storage controller 1 201. The storage controller 1 201 restores the LUN 1 211 using the data 230. In some instances, the storage controller 2 202 or the storage controller 1 201 may restructure the data 230 prior to storage. For example, if the data 230 was stored in the LUN 2 212 in a different block size than that indicated in the proprietary attributes 223, the storage controller 1 201 may restructure the data to the appropriate block size prior to storage.

Figure 3:
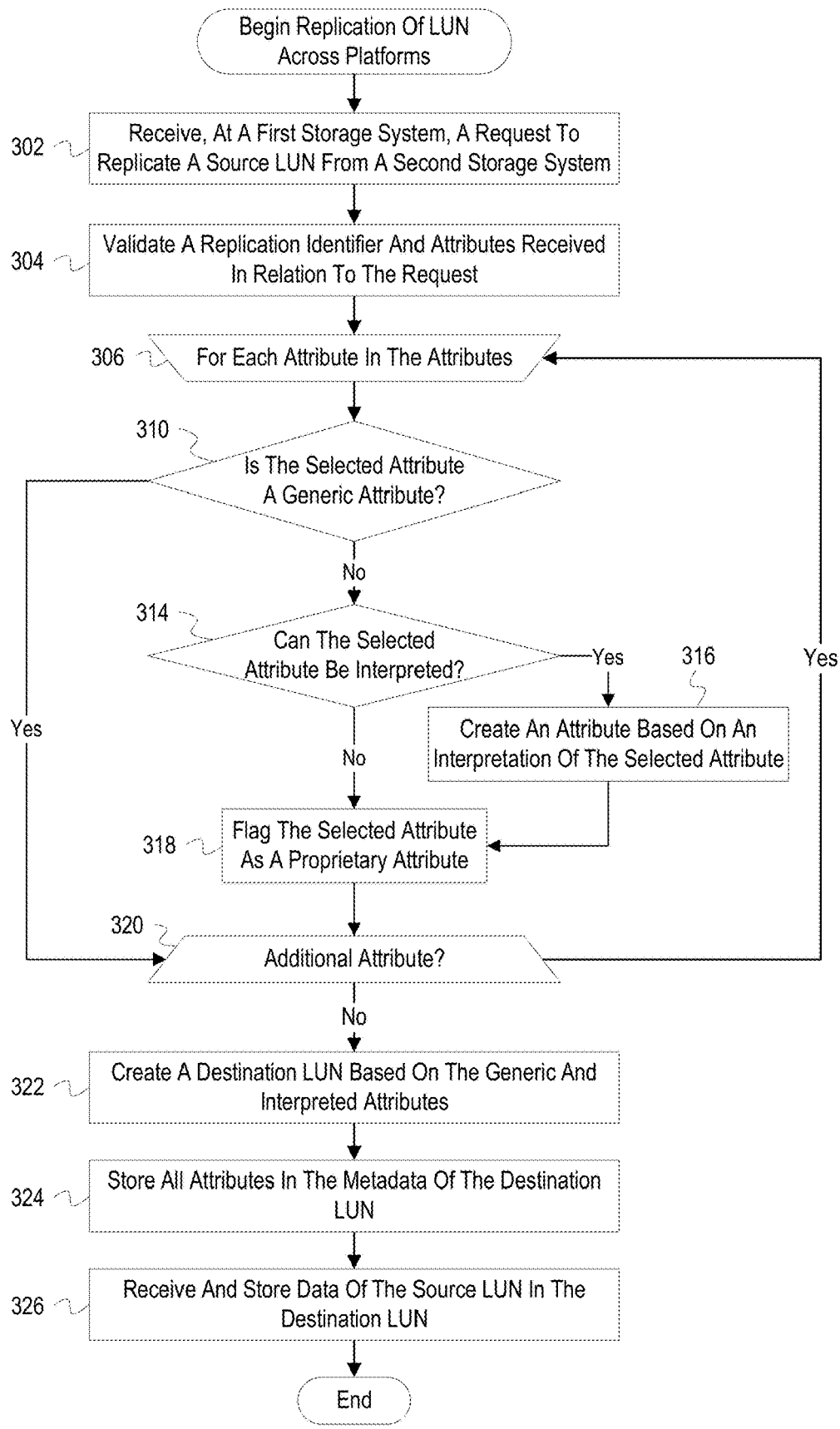
FIG. 3 depicts a flowchart with example operations for replicating a LUN across platforms.

FIG. 3 depicts a flowchart with example operations for replicating a LUN across platforms. FIG. 3 describes a storage controller as performing the operations for naming consistency with FIGS. 1 and 2, although naming of program code can vary among implementations.

A storage controller ("controller") of a first storage system receives a request to replicate a source LUN from a second storage system (302). The first storage system and the second storage system are based on different platforms meaning that the first storage system may utilize a different operating system, storage protocol, file system, etc. The controller of the first storage system may receive the request from a storage controller of the second storage system, or the request may have been generated through other software for replicating or backing up data and sent to the controller. The request may be formatted according to an application programming interface (API) of the first storage system and may be transmitted using various communication protocols such as hypertext transfer protocol (HTTP), secure HTTP (HTTPS), etc. As part of the replication request, the controller of the first storage system and a storage controller of the second storage system exchange attributes of the source LUN and a replication identifier. Various implementations may exchange the information in different ways. In some implementations, the request itself can include attributes of the source LUN and a proposed replication identifier. In other implementations, after receiving the request, the controller requests a list of specified attributes and proposes a replication identifier to the second storage system. The second storage system then responds with the requested information and validates the replication identifier. In general, however, the second storage system transmits all available attributes with the replication request so that the attributes can be replicated in addition to the data of the source LUN. Other data may be shared between the storage systems such as platform identifiers indicating the type of software executing on the respective storage systems. One or both of the storage systems may then use different communication protocols, format data differently, etc., based on the indicated platform type.

The controller validates the replication identifier and the attributes received in relation to the request (304). The replication identifier is a universally unique identifier that the first storage system and the second storage system use to identify transferred data related to the source LUN. The replication identifier may be numerical, alphanumerical, alphabetical, etc. The replication identifier may be randomly generated, iteratively generated based on a namespace, etc., by either the first storage system or the second storage system. The controller validates the replication identifier by ensuring the replication identifier is unique (i.e. does not conflict with an identifier of an existing storage object, such as a LUN, Volume, etc.) within the first storage system. The controller validates the attributes by ensuring that the controller has the minimum required attributes for creating a LUN. The controller may be configured with a list of the minimum required attributes and may request any missing attributes from the second storage system. For example, the controller may be configured to require that a LUN type attribute be indicated. The controller also validates the attributes by determining whether a LUN with such attributes can be created within the first storage system. For example, the controller may ensure that there is sufficient space for storing the source LUN based on an indicated size attribute. As an additional example, the controller may determine whether the source LUN is of a supported LUN type, supported block size, etc. If the controller is unable to create a LUN using the indicated attributes, the controller may propose substitute default attributes to the second storage system, or the controller may reject the replication request.

The controller begins mapping each of the attributes to attributes used by the first storage system (306). The attribute currently being mapped is hereinafter referred to as "the selected attribute."

The controller determines whether the selected attribute is a generic attribute (310). In general, a generic attribute is an attribute that is common across most storage system platforms and, therefore, will likely map directly to an attribute of the first storage system. An attribute of the second storage system maps directly if the attribute has a one-to-one correlation to an attribute of the first storage system. For example, a "size" attribute of the second storage system maps directly to a "size" attribute of the second storage system; conversely, a "snapshot frequency" attribute may not map directly if the first storage system does not support LUN snapshotting and, thus, does not have a corresponding attribute. The controller can determine whether the attribute maps directly by comparing an attribute identifier to attribute identifiers of the first storage system. If a match is identified, the controller determines that the attribute maps directly and is a generic attribute. In some implementations, the controller is configured with a list of generic attributes that should be automatically mapped to corresponding attributes for utilization by the first storage system.

If the attribute is not a generic attribute, the controller determines whether the selected attribute can be interpreted (314). The controller determines that the selected attribute can be interpreted if the controller is able to convert or translate the selected attribute to an attribute of the first storage system. For example, the controller may identify that the selected attribute is indicated in an incompatible unit of measurement, such as KB, and determine that the attribute can be converted to bytes to be compatible with the first storage system. In some implementations, the controller may be programmed with mappings of attribute identifiers for translating an attribute from a different storage system platform for use by the first storage system. For example, a mapping may indicate that a "snapshot frequency" attribute of a first platform maps to or is equivalent to a "snapshot rate" attribute of the first storage system. Based on a platform identifier for the second storage system, the controller can retrieve a list of attribute mappings that corresponds to the second storage system platform. The controller then uses an attribute identifier for the selected attribute to search the list of mappings. For example, the second storage system may have an attribute with an identifier of "user permissions." The controller may be programmed with a mapping indicating that the attribute "user permissions" of the second storage system platform type maps to an attribute of the first storage system with the identifier "read/write permissions." Based on this mapping, the controller determines that the selected attribute can be interpreted. In some implementations, the controller is configured with a list of attributes that should be automatically considered proprietary to the second storage system and should not be interpreted.

If the attribute can be interpreted, the controller creates an attribute based on an interpretation of the selected attribute (316). The controller interprets the selected attribute by converting a value of the selected attribute. For example, the controller may convert a value of the selected attribute to be in a format compatible with the first storage system. The new attribute will have an identifier similar to the selected attribute and will be assigned the converted value. The controller may also interpret the selected attribute by translating or mapping the selected attribute identifier to an identifier of the first storage system. The new attribute will have a different identifier than the selected attribute but will be assigned the same value as the selected attribute. The controller creates a new attribute instead of modifying the selected attribute so that the selected attribute can be retained in unmodified form.

If the selected attribute cannot be interpreted or after creating a new attribute based on interpreting the selected attribute, the controller flags the selected attribute as a proprietary attribute (318). The selected attribute is proprietary in that the selected attribute is native to the second storage system and cannot be utilized by the first storage system in its original form or at all. The selected attribute is still maintained in the first storage system, however, so that the selected attribute can be supplied and again utilized by the second storage system in the event of data loss at the second storage system. The controller flags the selected attribute as proprietary by adding the selected attribute to a list or data structure comprising other proprietary attributes.

After flagging the selected attribute as generic or proprietary, the controller determines whether there is an additional attribute to be mapped (320). If there is an additional attribute, the controller selects the next attribute (306).

If there is not an additional attribute, the controller creates a destination LUN based on the generic and interpreted attributes (322). The controller creates the destination LUN in a manner compatible with the software and file system of the first storage system. The controller, for example, generates a name for the destination LUN compatible with the first storage system. The controller also configures the destination LUN in accordance with the attributes. For example, the controller may reserve space in a volume of the first storage system for the destination LUN equal to a value of a size attribute.

The controller stores all attributes in the metadata of the destination LUN (324). The generic and interpreted attributes are stored normally for use by the first storage system. The proprietary attributes are stored opaquely as they are not used by the first storage system. For example, the proprietary attributes may be stored according to an opaque data type, may be stored as an opaque XML blob, stored together in a single field in the metadata, etc.

The controller receives data of the source LUN from the second storage system and stores the data in the destination LUN (326). After creating the LUN and storing the attributes, the controller may notify the second storage system that the destination LUN has been created and is ready to store data of the source LUN. In response, the second storage begins transmitting a data stream comprising the source LUN data. The data stream is accompanied by the agreed upon replication identifier so that the controller can identify the data as being intended for the destination LUN. The controller may maintain replication identifiers as an attribute in metadata of corresponding LUNs. In such implementations, the controller searches LUN metadata of LUNs in the first storage system to identify a LUN corresponding to the replication identifier. Alternatively, the controller may maintain mappings of replication identifiers to corresponding LUN names in memory of the controller or in another location, such as a location where namespace metadata is maintained. In such implementations, the controller uses the mappings to retrieve a name of a LUN corresponding to the replication identifier and uses the LUN name to identify a location of the LUN for storing the received data.

After the initial process of creating and replicating the LUN is completed as described above, the second storage system may continue periodically transmitting additional data to be replicated to the destination LUN. The data streams are communicated along with the replication identifier to the first storage system. As attributes of the source LUN change (e.g., as the size changes, name changes, etc.), updated attribute values are transmitted with the data streams. The controller of the first storage system updates the LUN according to the updated attribute values. The controller analyzes the updated attributes in a manner similar to that described above to determine whether the attributes are generic, can be interpreted, or are proprietary. If the attribute is generic or interpretable, the controller may reconfigure the destination LUN according to the updated attribute. For example, the controller may change the size of the LUN. If the attribute is a proprietary attribute, the controller may add the proprietary attribute to the metadata or update an existing proprietary attribute entry with the updated attribute value.

Figure 4:
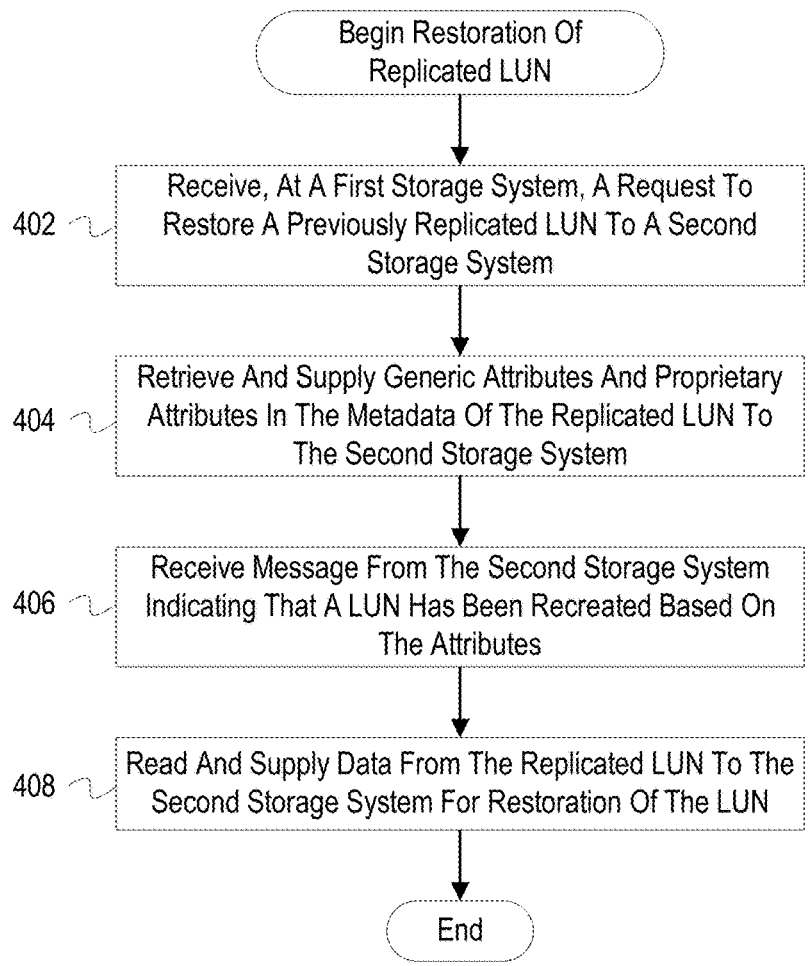
FIG. 4 depicts a flowchart with example operations for restoring a LUN previously replicated across platforms.

FIG. 4 depicts a flowchart with example operations for restoring a LUN previously replicated across platforms. FIG. 4 describes a storage controller as performing the operations for naming consistency with FIGS. 1 and 2, although naming of program code can vary among implementations.

A storage controller ("controller") of a first storage system receives a request to restore a LUN previously replicated by a second storage system (402). The LUN may have been previously replicated according to the operations depicted in FIG. 3. The request from the second storage system may include the replication identifier corresponding to the LUN being restored. In some instances, the replication identifier may have been lost during a storage system failure. In such instances, the controller identifies LUNs belonging to the second storage system and begins providing each LUN to the second storage system for restoration according to the operations described below. The controller will also supply the previously used replication identifier for each LUN so that replication operations can be resumed after restoration of the corresponding LUN.

The controller retrieves and supplies generic attributes and proprietary attributes stored in the metadata of the replicated LUN (404). Since the LUN was previously replicated by the second storage system, the LUN contains proprietary attributes utilized by the second storage system. The controller may provide the proprietary attributes automatically or in response to an API function call by the second storage system.

The controller receives a message from the second storage system indicating that the LUN has been recreated (406). The second storage system recreates the LUN according to the supplied attributes. Because the proprietary attributes were retained in their original form, the second storage system does not have to map, translate, or convert attributes in order to recreate the LUN in its original state. After the second storage system has successfully recreated the LUN, the second storage system may notify the controller that the LUN is ready to receive data.

The controller reads and supplies data from the replicated to the second storage system for restoration of the LUN (408). The controller initiates a data stream for transmitting the data from the replicated LUN. The controller transmits the replication identifier along with the data stream. Once the LUN has been fully restored, the restoration process ends.

Variations

FIGS. 1 and 2 are annotated with a series of letters A-F and A-D, respectively. These letters represent stages of operations. Although these stages are ordered for this example, the stages illustrate one example to aid in understanding this disclosure and should not be used to limit the claims. Subject matter falling within the scope of the claims can vary with respect to the order and some of the operations.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 310 and 314 of FIG. 3 can be performed in parallel or concurrently. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

The description above describes replication a LUN across two storage systems; however, similar operations can be used to replicate a LUN across more than two systems. For example, a LUN replicated from a first storage system to a second storage system may also be replicated to a third storage system. The proprietary attributes for each storage system are maintained with the LUN across each replication. In the example above, the LUN on the third storage system would have proprietary attributes for the first storage system and proprietary attributes for the second storage system. As a result, when replicating the LUN back to the first or the second storage system, the third storage system will have the corresponding proprietary attributes.

The description describes replicating a single LUN at a time for ease of explanation. Similar operations can be applied to replicate multiple LUNs in parallel or sequentially. Additionally, LUNs may be replicated together as a consistency group. A consistency group is a container that holds several LUNs and allows for the LUNs to be managed together as one entity. A consistency group has its own attributes apart from the attributes for the LUNs within the consistency group. For example, a consistency group may have attributes indicating a maximum number of allowable LUNs in the group, a maximum number of allowable snapshot images, etc. The attributes for the consistency group can be transmitted from a first storage system to a second storage system in a manner similar to that of transmitting LUN attributes. If the second storage system supports consistency groups, the second storage creates a consistency group container using the received attributes and also retains any proprietary attributes of the first storage system. If the second storage system does not support consistency groups, the second storage system can store the LUNs of the consistency group independently but still retain attributes of the consistency group. Additionally, along with the consistency group attributes, the second storage system can record the names of the LUNs belonging to the consistency group so that the LUNs will be supplied together during restoration/replication of the consistency group. Similar to a replication identifier for a LUN, a replication identifier can also be associated with a consistency group along with a sub-identifier for each constituent LUN. For example, a consistency group with three LUNs may have an identifier of "1", while the LUNs have the identifiers "1.1", "1.2", and "1.3". A storage system can then transmit data or updated attributes for the consistency group with the replication identifier "1" and transmit data for a specific LUN within the consistency group using one of the LUN-specific replication identifiers, such as "1.2".

Although the above description focuses on the replication and restoration of data, similar operations are performed for LUN migration across different storage system platforms. When migrating a LUN, LUN attributes are still shared across storage systems and may similarly be mapped or interpreted for use by the destination storage system. Additionally, any proprietary attributes may similarly be retained for instances where the LUN is migrated back to an original storage system or is migrated to a storage system which utilizes a similar platform as the original storage system.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 5:
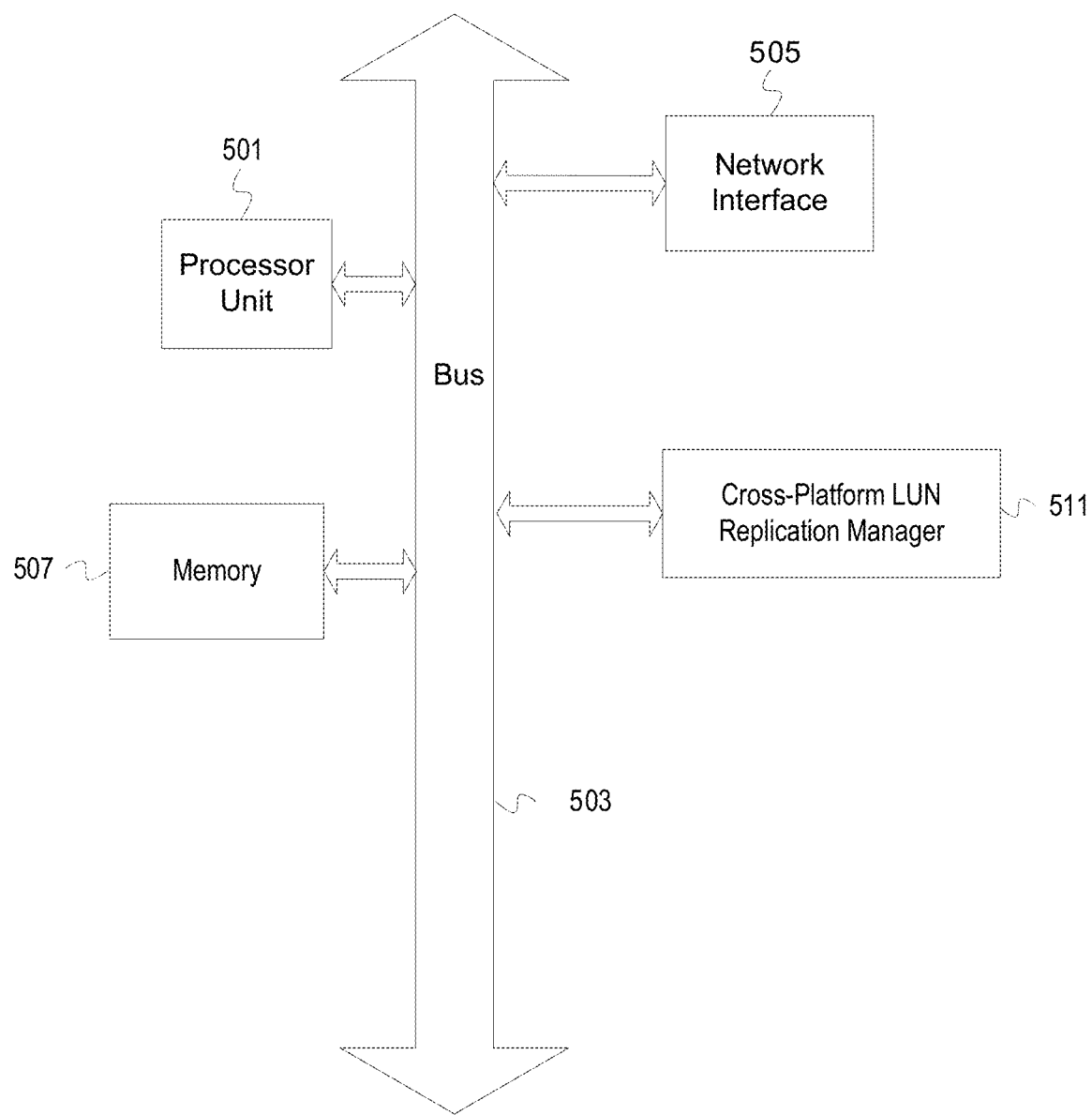
FIG. 5 depicts an example computer system with a cross-platform LUN replication manager.

FIG. 5 depicts an example computer system with a cross-platform LUN replication manager. The computer system includes a processor unit 501 (possibly including multiple processors, multiple cores, multiple nodes, and/or implementing multi-threading, etc.). The computer system includes memory 507. The memory 507 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 503 (e.g., PCI, ISA, PCI-Express, HyperTransport® bus, InfiniBand® bus, NuBus, etc.) and a network interface 505 (e.g., a Fiber Channel interface, an Ethernet interface, an internet small computer system interface, SONET interface, wireless interface, etc.). The system also includes a cross-platform LUN replication manager 511. The cross-platform LUN replication manager 511 manages the replication of LUNs originating from a storage system based on a different platform and preserves attributes of the originating storage system. Any one of the previously described functionalities may be partially (or entirely) implemented in hardware and/or on the processor unit 501. For example, the functionality may be implemented with an application specific integrated circuit, in logic implemented in the processor unit 501, in a co-processor on a peripheral device or card, etc. Further, realizations may include fewer or additional components not illustrated in FIG. 5 (e.g., video cards, audio cards, additional network interfaces, peripheral devices, etc.). The processor unit 501 and the network interface 505 are coupled to the bus 503. Although illustrated as being coupled to the bus 503, the memory 507 may be coupled to the processor unit 501.

While the aspects of the disclosure are described with reference to various implementations and exploitations, it will be understood that these aspects are illustrative and that the scope of the claims is not limited to them. In general, techniques for replicating LUNs across disparate storage system platforms as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Additional Terminology

This description uses shorthand terms related to cloud technology for efficiency and ease of explanation. When referring to "a cloud," this description is referring to the resources of a cloud service provider. For instance, a cloud can encompass the servers, virtual machines, and storage devices of a cloud service provider. The term "cloud destination" and "cloud source" refer to an entity that has a network address that can be used as an endpoint for a network connection. The entity may be a physical device (e.g., a server) or may be a virtual entity (e.g., virtual server or virtual storage device). In more general terms, a cloud service provider resource accessible to customers is a resource owned/manage by the cloud service provider entity that is accessible via network connections. Often, the access is in accordance with an application programming interface or software development kit provided by the cloud service provider.

This description uses the term "data stream" to refer to a unidirectional stream of data flowing over a data connection between two entities in a session. The entities in the session may be interfaces, services, etc. The elements of the data stream will vary in size and formatting depending upon the entities communicating with the session. Although the data stream elements will be segmented/divided according to the protocol supporting the session, the entities may be handling the data at an operating system perspective and the data stream elements may be data blocks from that operating system perspective. The data stream is a "stream" because a data set (e.g., a volume or directory) is serialized at the source for streaming to a destination. Serialization of the data stream elements allows for reconstruction of the data set. The data stream is characterized as "flowing" over a data connection because the data stream elements are continuously transmitted from the source until completion or an interruption. The data connection over which the data stream flows is a logical construct that represents the endpoints that define the data connection. The endpoints can be represented with logical data structures that can be referred to as interfaces. A session is an abstraction of one or more connections. A session may be, for example, a data connection and a management connection. A management connection is a connection that carries management messages for changing state of services associated with the session.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

What is claimed is:

1. A method comprising:
   analyzing, by a first storage system, attributes of a source logical unit number (LUN) received from a second storage system to identify first attributes usable by the first storage system and second attributes proprietary to the second storage system and unusable by the first storage system based upon a determination that values of the second attributes are unable to be converted to be compatible with the first storage system,
   creating a destination LUN in the first storage system based on the first attributes;
   opaquely storing the second attributes within metadata of the destination LUN; and
   storing data of the source LUN received from the second storage system in the destination LUN.

2. The method of claim 1 further comprising:
   based on receipt of an indication that the source LUN is to be replicated back to the second storage system, supplying the second attributes to the second system.

3. The method of claim 1, comprising:
   identifying an attribute as being usable by the first system based upon the attribute matching an attribute identifier of the first storage system.

4. The method of claim 1, comprising:
   converting a value of an attribute to be compatible with the first storage system, wherein the attribute is identified as the first attributes.

5. The method of claim 1 further comprising:
   restructuring the data of the source LUN received from the second storage system to be compatible with the first storage system prior to storing the data in the destination LUN.

6. The method of claim 5, comprising:
   based on receipt of an indication that the source LUN is to be restored, restructuring the data of the destination LUN to be compatible with the second system prior to supplying the data in the destination LUN to the second system for restoration of the source LUN.

7. A non-transitory machine-readable media comprising program code to:
   analyze, by a first storage system, attributes of a source logical unit number (LUN) received from a second storage system to identify first attributes usable by the first storage system and second attributes proprietary to the second storage system and unusable by the first storage system based upon a determination that values of the second attributes are unable to be converted to be compatible with the first storage system;
   create a destination LUN in the first storage system based on the first attributes;
   opaquely store the second attributes within metadata of the destination LUN; and
   store data of the source LUN received from the second storage system in the destination LUN.

8. The machine-readable media of claim 7 further comprising program code to:
   based on receipt of an indication that the source LUN is to be replicated back to the second storage system, supplying the second attributes to the second storage system.

9. The machine-readable media of claim 7, comprising program code to:

identify an attribute as being unusable by the first storage system based upon the attribute lacking a mapping to a target attribute of the first storage system.

10. The machine-readable media of claim 7, comprising programming code to:
convert a value of an attribute to be compatible with the first storage system, wherein the
attribute is identified as the first attributes.

11. The machine-readable media of claim 7 further comprising program code to:
restructure the data of the source LUN received from the second storage system to be compatible with the first storage system prior to storing the data in the destination LUN.

12. An apparatus comprising:
a processor; and
a machine-readable medium having program code executable by the processor to cause the apparatus to,
analyze, by a first storage system, attributes of a source logical unit number (LUN) received from a second storage system to identify first attributes usable by the first storage system and second attributes proprietary to the second storage system and unusable by the first storage system based upon a determination that values of the second attributes are unable to be converted to be compatible with the first storage system;
create a destination LUN in the first storage system based on the first attributes;
opaquely store the second attributes within metadata of the destination LUN; and
store data of the source LUN received from the second storage system in the destination LUN.

13. The apparatus of claim 12 further comprising program code executable by the processor to cause the apparatus to:
based on receipt of an indication that the source LUN is to be replicated back to the second storage system, supplying the second attributes to the second storage system.

14. The apparatus of claim 12, wherein the program code executable by the processor causes the processor to:
identify an attribute as being usable based upon the attribute matching an attribute identifier of the first storage system.

15. The apparatus of claim 12, wherein the program code executable by the processor causes the processor to:
convert a value of an attribute to be compatible with the first storage system, wherein the attribute is identified as the first attributes.

16. The apparatus of claim 12 further comprising program code executable by the processor to cause the apparatus to:
restructure the data of the source LUN received from the second storage system to be compatible with the first storage system prior to storing the data in the destination LUN.

17. The apparatus of claim 12, wherein the program code executable by the processor causes the processor to:
create a data structure to represent the destination LUN within the first storage system, wherein the data structure to represent the destination LUN is different than a data structure that represents the source LUN within the second storage system.

* * * * *